(12) United States Patent
Kim et al.

(10) Patent No.: US 12,647,246 B2
(45) Date of Patent: Jun. 2, 2026

(54) STORAGE DEVICE, STORAGE SYSTEM OPERATING METHOD, AND COMPUTING SYSTEM

(71) Applicant: SAMSUNG ELECTRONICS CO., LTD., Suwon-si (KR)

(72) Inventors: Minho Kim, Seongnam-si (KR); Wijik Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 752 days.

(21) Appl. No.: 17/872,180

(22) Filed: Jul. 25, 2022

(65) Prior Publication Data

US 2023/0035988 A1     Feb. 2, 2023

(30) Foreign Application Priority Data

Jul. 27, 2021  (KR) ......................... 10-2021-0098683
Mar. 25, 2022  (KR) ......................... 10-2022-0037406

(51) Int. Cl.
 *G06F 3/06*        (2006.01)
 *H04L 9/00*        (2022.01)
(52) U.S. Cl.
 CPC .................................... H04L 9/008 (2013.01)
(58) Field of Classification Search
 CPC ...................................................... H04L 9/008
 See application file for complete search history.

(56) References Cited

U.S. PATENT DOCUMENTS 8,515,058 B1    8/2013  Gentry
9,166,785 B2   10/2015  Yasuda et al.

| | | | |
|---|---|---|---|
| 9,276,734 B2 | 3/2016 | Naganuma | |
| 10,211,975 B2 * | 2/2019 | Loftus | H04L 9/008 |
| 10,541,805 B2 * | 1/2020 | Laine | H04L 9/008 |
| 10,778,409 B2 | 9/2020 | Cheon et al. | |
| 10,924,262 B2 | 2/2021 | Shim et al. | |
| 11,032,061 B2 * | 6/2021 | Chen | H04L 9/0631 |

(Continued)

FOREIGN PATENT DOCUMENTS

JP     6083234 B2    2/2017
KR    101600016      3/2016

(Continued)

OTHER PUBLICATIONS

"Intel, Microsoft join DARPA effort to accelerate fully homomorphic encryption", https://www.csoonline.com/article/3610752/intel-microsoft-join-darpa-effort-to-accelerate-fully-homomorphic-encryption.html.

(Continued)

*Primary Examiner* — John B King
*Assistant Examiner* — Alex D Carrasquillo
(74) *Attorney, Agent, or Firm* — Fish & Richardson P.C.

(57)     ABSTRACT

A storage device includes a non-volatile memory, and a memory controller, wherein the memory controller encrypts plaintext to generate a homomorphic ciphertext with a first level among homomorphic ciphertexts with different levels, stores the homomorphic ciphertext with the first level in the non-volatile memory, and provides the homomorphic ciphertext with the first level in response to a request received from a host. The homomorphic ciphertext with the first level has a smallest length among the homomorphic ciphertexts with different levels.

18 Claims, 13 Drawing Sheets

1

(56)　　　　　　References Cited

U.S. PATENT DOCUMENTS

| | | | | |
|---|---|---|---|---|
| 11,374,736 | B2 * | 6/2022 | Gao | H04L 9/3093 |
| 11,509,454 | B2 * | 11/2022 | Cheon | H04L 9/0618 |
| 11,843,687 | B2 * | 12/2023 | Khedr | H04L 9/30 |
| 2013/0170640 | A1 * | 7/2013 | Gentry | H04L 9/008 |
| | | | | 380/30 |
| 2013/0216044 | A1 * | 8/2013 | Gentry | H04L 9/008 |
| | | | | 380/277 |
| 2015/0312031 | A1 * | 10/2015 | Seo | H04L 9/008 |
| | | | | 380/28 |
| 2019/0363872 | A1 * | 11/2019 | Shim | H04L 9/0618 |
| 2020/0403781 | A1 * | 12/2020 | Gentry | H04L 9/0618 |
| 2021/0111864 | A1 | 4/2021 | Gentry et al. | |
| 2021/0399872 | A1 * | 12/2021 | Chen | H04L 9/0631 |

FOREIGN PATENT DOCUMENTS

| | | | | |
|---|---|---|---|---|
| KR | 10-1829267 | 2/2018 | | |
| KR | 101919940 | 11/2018 | | |
| KR | 101971215 | 4/2019 | | |
| KR | 102213819 | 2/2021 | | |
| WO | WO-2019094303 A1 * | 5/2019 | | H04L 9/008 |

OTHER PUBLICATIONS

European Search Report Dated Dec. 2, 2022, Cited in Ep Patent Application No. 22185638.8.

* cited by examiner

1

| SNR | operation type | operation count | Consumed level | bootstrapped level |
|---|---|---|---|---|
| SNR1 | Multiply | Count 1 | sL1 | L1 |
| SNR2 | Add | Count 2 | sL2 | L2 |
| SNR3 | Multiply, Add | Count 3 | sL3 | L3 |

SNRT

Figure 19:
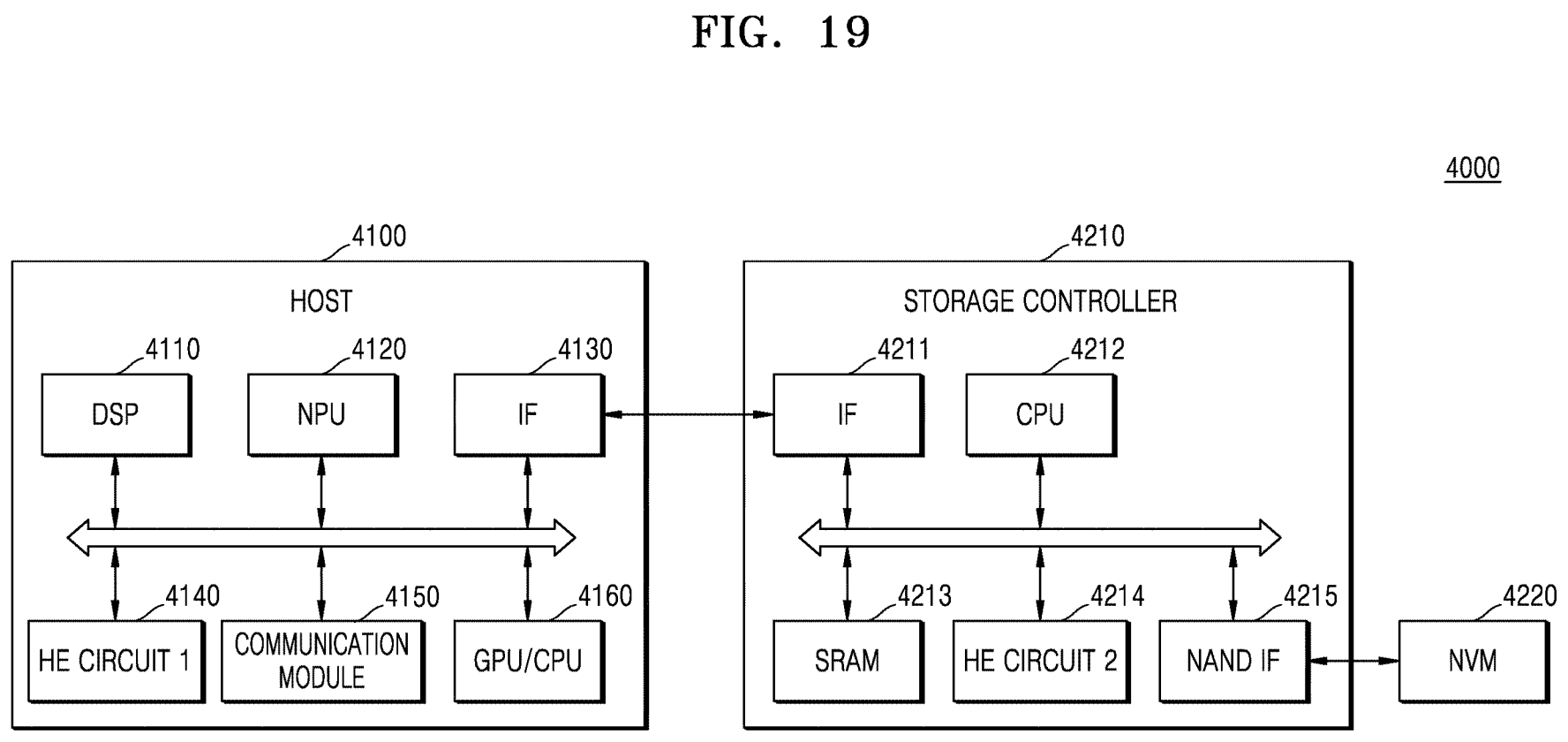

HOST 4100

DSP 4110

NPU 4120

IF 4130

HE CIRCUIT 1 4140

COMMUNICATION MODULE 4150

GPU/CPU 4160

STORAGE CONTROLLER 4210

IF 4211

CPU 4212

SRAM 4213

HE CIRCUIT 2 4214

NAND IF 4215

NVM 4220

STORAGE DEVICE, STORAGE SYSTEM OPERATING METHOD, AND COMPUTING SYSTEM

CROSS-REFERENCE TO RELATED APPLICATIONS

This application claims priority under 35 U.S.C. § 119 to Korean Patent Application No. 10-2021-0098683 filed on Jul. 27, 2021 and Korean Patent Application No. 10-2022-0037406 filed on Mar. 25, 2022, the collective subject matter of which is hereby incorporated by reference in its entirety.

BACKGROUND

The inventive concept relates generally to data storage systems. More particularly, the inventive concept relates to hosts and storage devices capable of communicating (e.g., transmitting and/or receiving) a level-0 homomorphic ciphertext.

As communication technology develops and the use of electronic devices becomes more common, continuing efforts seeks to maintain communication security between electronic devices. Accordingly, most communication devices and technologies use some form of data encryption/decryption.

Historically, when an encrypted message is communicated between parties, the receiving party must decrypt the encrypted message before performing another operation in relation to the message's information. However, during the decryption process, a third party hacker may access data in its temporarily decrypted state.

In order to address this potential problem, certain homomorphic encryption methods have been studied. Consistent with a homomorphic encryption method, an operation may be performed on a ciphertext without necessarily decrypting a received encrypted message. Nonetheless, correct results may be obtained, as compared with results obtained by encrypting a result of an operation on a preliminary text. Therefore, various operations may be securely performed on a ciphertext without requiring decryption of the encrypted message.

SUMMARY

Embodiments of the inventive concept relate to storage systems communicating a homomorphic ciphertext with a minimum length, such that the homomorphic ciphertext may be decrypted using an approach that increases overall data transfer rate(s).

According to an aspect of the inventive concept, a storage device may include; a non-volatile memory, and a memory controller configured to encrypt plaintext to generate a homomorphic ciphertext with a first level among homomorphic ciphertexts with different levels, store the homomorphic ciphertext with the first level in the non-volatile memory, and provide the homomorphic ciphertext with the first level in response to a request received from a host, wherein the homomorphic ciphertext with the first level has a smallest length among the homomorphic ciphertexts with different levels.

According to an aspect of the inventive concept, a storage system operating method for a storage system including a host and a storage device may include; in the storage device, encrypting a first plaintext to a first homomorphic ciphertext with a first length, communicating the first homomorphic ciphertext from the storage device to the host, in the host, generating a second homomorphic ciphertext with a second length in response to the first homomorphic ciphertext, and generating a third homomorphic ciphertext with the first length by performing an operation between the second homomorphic ciphertext and another homomorphic ciphertext, communicating the third homomorphic ciphertext from the host to the storage device, and in the storage device, generating a second plaintext by decrypting the third homomorphic ciphertext, wherein the first length of the first homomorphic ciphertext and the third homomorphic ciphertext is a minimum length in which each of the first homomorphic ciphertext and the third homomorphic ciphertext is decryptable.

According to an aspect of the inventive concept, a computing system may include; a mobile device including a homomorphic encryption circuit configured to encrypt a first plaintext to a first homomorphic ciphertext with a first level and a storage device configured to store the first homomorphic ciphertext, and a server configured to receive the first homomorphic ciphertext, bootstrap the first homomorphic ciphertext to a second homomorphic ciphertext with a second level, generate a third homomorphic ciphertext with the first level by performing at least one homomorphic operation on the second homomorphic ciphertext, and provide the third homomorphic ciphertext to the mobile device.

According to an aspect of the inventive concept, a universal flash storage (UFS) may include; non-volatile memory configured to store data, an interface circuit configured to receive an instruction from a host, and a UFS device controller configured to perform an operation on the non-volatile memory in response to the instruction and to provide the response to the instruction to the host, wherein the UFS device controller encrypts data received from the host to a first homomorphic ciphertext with a minimum length in which the first homomorphic ciphertext is decryptable and stores the first homomorphic ciphertext in the non-volatile memory.

BRIEF DESCRIPTION OF THE DRAWINGS

Advantages, benefits, and features, as well as the making and use of the inventive concept, may be more clearly understood upon consideration of the following detailed description together with the accompanying drawings, in which:

FIG. 17 is a view illustrating a universal flash storage (UFS) system according to an embodiment of the inventive concept;

FIG. 18 is a view illustrating a UFS system according to an embodiment of the inventive concept; and FIG. 19 is a view illustrating a computing system according to an embodiment of the inventive concept.

DETAILED DESCRIPTION

Throughout the written description and drawings, like reference numbers and labels are used to denote like or similar elements, components, features and/or method steps.

Figure (FIG.) 1 is a block diagram illustrating a storage system 1 according to embodiments of the inventive concept.

Figure 1:
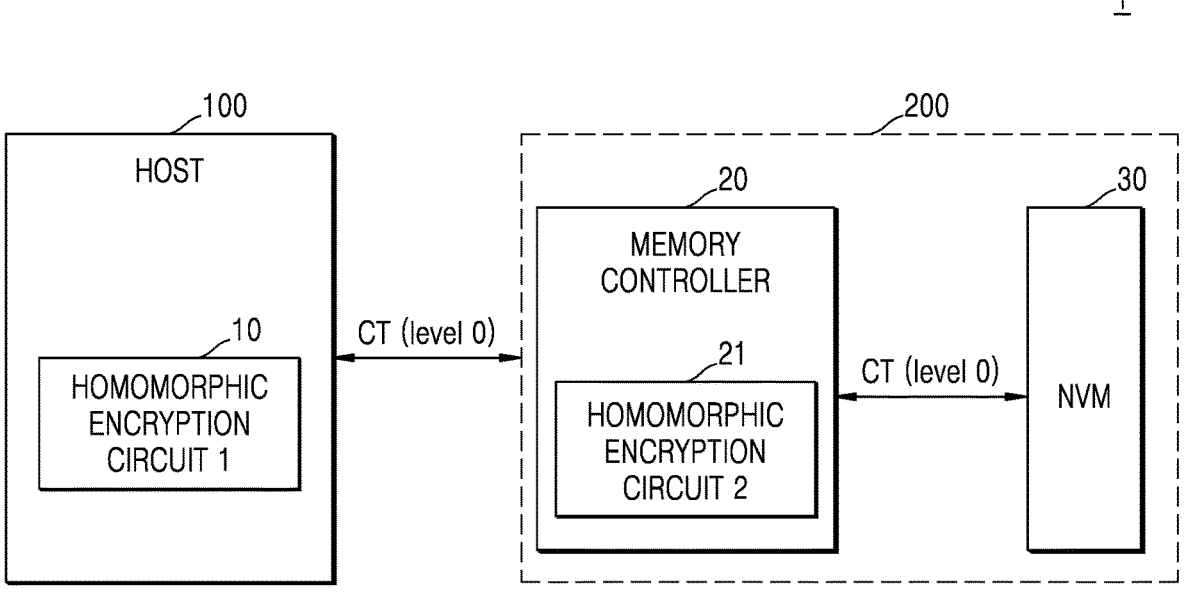
FIG. 1 is a block diagram illustrating a storage system according to an embodiment of the inventive concept.

Referring to FIG. 1, the storage system 1 may generally include a host 100 and a storage device 200.

The storage system 1 may be a standalone computing system, such as a server, a desktop computer, kiosk, etc. In some embodiments, the storage system 1 may be a portable computing system, a mobile phone, a wearable device, a laptop computer, etc. In some embodiments, the storage system 1 may be a subsystem included in an arbitrary system, different from a standalone computing system or a portable computing system, such as home appliances, industrial equipment, a transportation vehicle or device, etc.

The host 100 may include a first homomorphic encryption circuit 10. The first homomorphic encryption circuit 10 may be used to encrypt a plaintext PT to a homomorphic ciphertext CT and/or decrypt a homomorphic ciphertext CT to a plaintext PT using a homomorphic encryption algorithm. In this context, a homomorphic ciphertext may be understood by the term "ciphertext." Due to characteristics of the homomorphic encryption method, various operations may be performed between homomorphic ciphertexts. That is, decrypted data resulting from a homomorphic encryption operation may coincide with (i.e., be the same as) an operation result between plaintexts. Because the homomorphic encryption method enables operations between ciphertexts, data security is enhanced.

The first homomorphic encryption circuit 10 may be used to encrypt a plaintext PT to a level-0 ciphertext CT or decrypt a level-0 ciphertext CT into a corresponding plaintext PT. In this regard, a "level" may be understood as a number times (or a depth) that multiplication operations are performed in relation to the ciphertext CT. Further in this regard, different (or a plurality of) homomorphic ciphertexts variously associated with embodiments of the inventive concept may be generated with one level among a number of different levels (e.g., a level-0, a level-1, a level-2, etc.) For example, when a level of the ciphertext CT is 1, a single multiplication operation has been performed on the ciphertext CT once. Thus, for a level-1 ciphertext CT, a multiplication operation may be performed on the ciphertext CT one time, and the results of the multiplication operation may be decrypted into a plaintext PT. Alternately, for a level-0 ciphertext CT, although a multiplication operation may have been performed on the ciphertext CT, the result of the multiplication operation may not be decrypted.

Further, the level of the ciphertext CT may be understood as corresponding to a length (or size) of the ciphertext CT. Generally speaking, the higher the level of the ciphertext CT, the greater the length of the ciphertext CT will be.

The first homomorphic encryption circuit 10 may perform a bootstrapping operation on the ciphertext CT and may perform a multiplication operation on the bootstrapped ciphertext CT. The first homomorphic encryption circuit 10 may perform various operations, such as an addition operation and a modular operation, on the bootstrapped ciphertext CT. The bootstrapping operation may increase the level of the ciphertext CT. Thus, by use of the bootstrapping operation, the length of the ciphertext CT may increase and the number of multiplication operations that may be performed on the ciphertext CT may increase.

The host 100 and the storage device 200 may communicate the level-0 ciphertext CT. The level-0 ciphertext CT may be a homomorphic ciphertext with a smallest length that may be correctly decrypted into a plaintext PT. In the storage system 1 of FIG. 1, the host 100 and the storage device 200 may communicate using level-0 ciphertext(s) CT to maximize data transfer efficiency.

The storage device 200 may include a memory controller 20 and non-volatile memory (NVM) 30. The storage device 200 may include storage media configured to store data in response to request(s) from the host 100. In some embodiment, the storage device 200 may include at least one of a solid state drive (SSD), embedded memory, and detachable external memory. When the storage device 200 is an SSD, the storage device 200 may follow the NVM express (NVMe) standard. When the storage device 200 is an embedded memory or an external memory, the storage device 200 may follow the universal flash storage (UFS) standard or the embedded multi-media card (eMMC) standard. Each of the host 100 and the storage device 200 may generate and communicate a packet in accordance with an adopted standard protocol.

When the NVM 30 includes flash memory, the flash memory may include a 2D NAND memory array or a 3D (or vertical) NAND (VNAND) memory array. As another example, the storage device 200 may include various other types of NVM. For example, the storage device 200 may include magnetic random access memory (MRAM), spin-transfer torque MRAM, conductive bridging RAM (CBRAM), ferroelectric RAM (FeRAM), phase-change RAM (PRAM), resistive RAM (ReRAM), and various other types of memory.

The memory controller 20 may store the level-0 ciphertext CT in the NVM 30 and/or read the level-0 ciphertext CT from the NVM 30. In the storage device 200 according to an embodiment of the inventive concept, the memory controller 20 stores the level-0 ciphertext CT with the smallest length in the NVM 30 so that a storage speed may increase.

The NVM 30 may include a plurality of data blocks. Each of the plurality of data blocks may store the level-0 ciphertext CT. In some embodiments, a ciphertext CT with a level greater than 0 may not be stored in the plurality of data blocks.

The memory controller 20 may include a second homomorphic encryption circuit 21. In some embodiments, the second homomorphic encryption circuit 21 may perform at least one operation on the ciphertext CT. Here, the second homomorphic encryption circuit 21 may perform a bootstrapping operation on the level-0 ciphertext CT and may perform a multiplication operation on the bootstrapped ciphertext CT. Alternately, the second homomorphic encryption circuit 21 may perform various operations, such as an addition operation and a modular operation, on the bootstrapped ciphertext CT.

In some embodiments, a level of the ciphertext CT corresponding to the operation result obtained by the second homomorphic encryption circuit 21 may be greater than 0. The second homomorphic encryption circuit 21 may change the level of the ciphertext CT corresponding to the operation result to 0. That is, the second homomorphic encryption circuit 21 may change a length of the ciphertext CT to the smallest length in which the ciphertext CT may be decrypted. The memory controller 20 stores the level-0 ciphertext CT in the NVM 30 in order to increase data storage speed. Thus, the memory controller 20 may provide the level-0 ciphertext CT to the host 100 such that data transmission efficiency for the storage system 1 may be improved.

Figure 2:
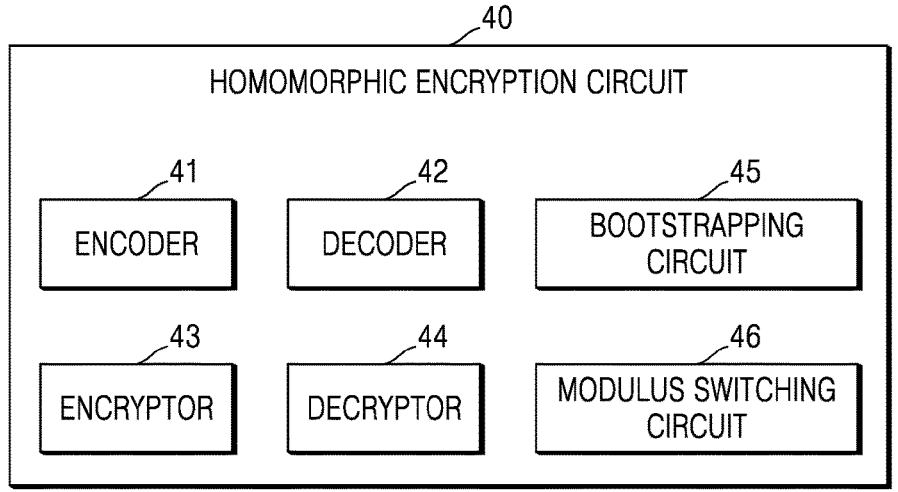
FIG. 2 is a block diagram illustrating a homomorphic encryption circuit according to an embodiment of the inventive concept.

FIG. 2 is a block diagram illustrating a homomorphic encryption circuit 40 according to embodiments of the inventive concept.

Referring to FIG. 2, the homomorphic encryption circuit 40 may include an encoder 41, a decoder 42, an encryptor 43, a decryptor 44, a bootstrapping circuit 45, and a modulus switching circuit 46. In some embodiments, at least one of the components of the homomorphic encryption circuit 40 may be omitted. Here, the homomorphic encryption circuit 40 may be one example of the first and/or second homomorphic encryption circuit(s) 10 or 21 of FIG. 1.

The encoder 41 may generate a plaintext polynomial m(x) corresponding to a message vector z. The message vector z may mean input data to be encrypted. In the current specification, the plaintext polynomial m(x) may be referred to as a plaintext PT.

Figure 3:
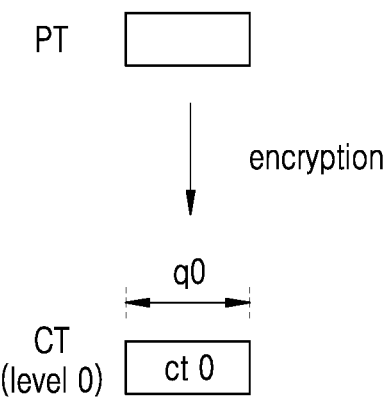
FIG. 3 is a view illustrating encryption according to an embodiment of the inventive concept.

The encryptor 43 may generate a ciphertext CT based on a shared key pk and the plaintext polynomial m(x). In some embodiments, the encryptor 43 may generate a level-0 ciphertext CT, and because the level-0 ciphertext CT has the smallest length allowing decryption of the ciphertext CT, encryption time may be reduced. In this regard, FIG. 3 is a conceptual diagram illustrating an exemplary encryption method that may be used in relation to embodiments of the inventive concept.

Figure 4:
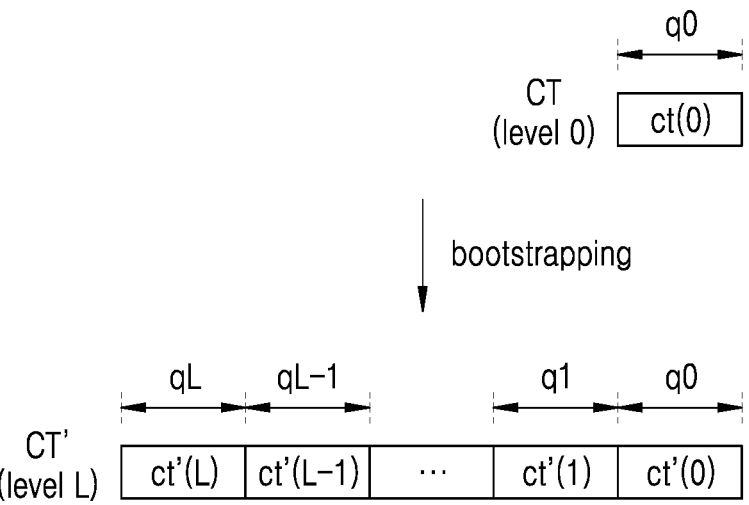
FIG. 4 is a view illustrating a bootstrapping operation according to an embodiment of the inventive concept.

Referring to FIG. 2, the bootstrapping circuit 45 may generate a ciphertext CT with a level k (wherein 'k' is a positive integer) based on the level-0 ciphertext CT. In this regard, k multiplication operations may be performed on the level-k ciphertext CT. A length of the level-k ciphertext CT may be greater than the length of the level-0 ciphertext CT. That is, it takes long to perform a bootstrapping operation. In some embodiments, the bootstrapping circuit 45 adaptively changes the level of the ciphertext CP in accordance with how many times multiplication operations have been performed on the bootstrapped ciphertext so that bootstrapping performance may improve. In this regard, FIG. 4 is a conceptual diagram illustrating an exemplary bootstrapping method that may be used in relation to embodiments of the inventive concept.

Figure 5:
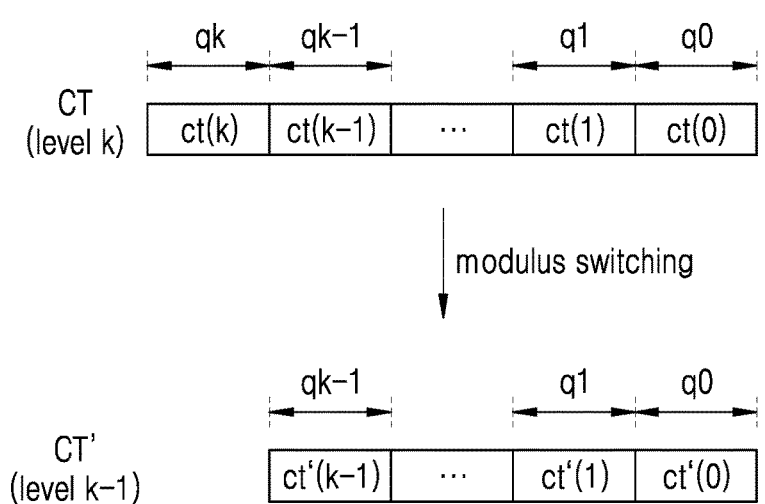
FIG. 5 is a view illustrating a modulus switching operation according to an embodiment of the inventive concept.

At least one of the homomorphic ciphertexts with different levels may be generated by a modular operation performed in accordance with a plurality of moduli. For example, the modulus switching circuit 46 may control the length of the ciphertext by changing a modulus of the ciphertext. That is, the modulus switching circuit 46 may reduce the length of the ciphertext by performing a modular operation on the ciphertext based on a modulus with a reduced length. As the modular operation is performed, the level of the ciphertext may be reduced. For example, the modulus switching circuit 46 may generate the level-0 homomorphic ciphertext by performing the modular operation in accordance with a smallest modulus among the plurality of moduli. A modulus switching operation may be referred to as a rescaling operation. In this regard, FIG. 5 is a conceptual diagram illustrating an exemplary modulus switching operation that may be used in relation to embodiment of the inventive concept.

The decryptor 44 may generate a plaintext polynomial m'(x) based on a secret key sk and the level-0 ciphertext CT. An exemplary decryption method will be described hereafter in some additional detail with reference to FIG. 3.

The decoder 42 may generate a vector message z' corresponding to the plaintext polynomial m'(x). The vector message z' may be the same as a vector message z in an effective number of bits (ENOB).

The encryptor 43 may generate a ciphertext CT based on a shared key pk and the plaintext polynomial m(x). Here, the shared key pk may be expressed according to [Equation 1] that follows:

$$pk=(b^{(j)}(x),a^{(j)}(x))_{0\leq j\leq L},$$ [Equation 1]

wherein L represents the maximum level of a ciphertext and $b^{(j)}(x)$ and $a^{(j)}(x)$ that share a relationship expressed by [Equation 2] that follows:

$$b^{(j)}(x)=-a^{(j)}(x)\cdot s(x)+e(x),$$ [Equation 2]

wherein, s(x) represents a secret key polynomial and e(x) represents an error polynomial.

Here, the encryptor 43 of FIG. 2, for example, may generate the level-0 ciphertext CT in accordance with [Equation 3] that follows:

$$CT =$$ [Equation 3]
$$\left(v(x)\cdot\left(b^{(j)}(x),\,a^{(j)}(x)\right)+(m(x)+e0(x),\,e1(x))\right)(\mathrm{mod}\ q_j)_{j=0} =$$
$$\left(v(x)\cdot b^{(j)}(x)+m(x)+e0(x),\,v(x)\cdot a^{(j)}(x)+e1(x)\right)$$
$$(\mathrm{mod}\ q_j)_{j=0} = ct(0),$$

wherein v(x) represents a polynomial with a coefficient −1, 0, or 1, e0(x) and e1(x) represents error polynomials, and $q_j$ represents a modulus.

That is, in accordance with [Equation 3], when j=0, the encryptor 43 may generate the level-0 ciphertext CT based on a shared key value. A value calculated when j=0 may be expressed as a 0th sub-ciphertext ct(0). That is, the level-0 ciphertext CT may be the 0th sub-ciphertext ct(0).

Referring to FIG. 3, when the 0th sub-ciphertext ct(0) is represented by a bit and a modulus q0 is a square of 2, a length of the 0th sub-ciphertext ct(0) may be determined by the modulus q0. Specifically, the length of the 0th sub-ciphertext ct(0) may be $\log_2 q0$.

From the foregoing it may be appreciated that according to certain embodiments of the inventive concept, during homomorphic encryption, by encrypting a plaintext PT to the level-0 ciphertext CT, encryption speed may be increased.

Referring to FIGS. 2 and 4, the bootstrapping circuit 45 may generate a level-L output ciphertext CT' by bootstrapping the level-0 input ciphertext CT. That is, the bootstrapping circuit 45 may generate the level-L output ciphertext CT' by increasing a level of the input ciphertext CT.

For example, the bootstrapping circuit 45 of FIG. 2 may be used to generate the level-L output ciphertext CT' in accordance with [Equation 4] that follows:

$$CT' = \qquad\qquad\qquad\qquad [\text{Equation 4}]$$

$$\left(v(x) \cdot \left(b^{(j)}(x),\, a^{(j)}(x)\right) + (m(x) + e0(x),\, e1(x))\right)(\text{mod } q_j)_{0 \leq j \leq L} =$$

$$\left(v(x) \cdot b^{(j)}(x) + m(x) + e0(x),\, v(x) \cdot a^{(j)}(x) + e1(x)\right)_{0 \leq j \leq L},$$

wherein L represents a bootstrapping level.

Here, it should be additionally noted that in some embodiments, the bootstrapping level may adaptively change. In this regard, an embodiment in which the bootstrapping level changes will be described hereafter with reference to FIG. 8.

Referring to [Equation 4], when ($0 \leq j \leq L$), wherein L is a positive integer, the bootstrapping circuit 45 may generate the level-L output ciphertext CT' based on the shared key value. Additionally, it may be understood that the level-L output ciphertext CT' includes 0th to Lth sub-output ciphertexts ct'(0) to ct'(L).

During bootstrapping, the bootstrapping circuit 45 may perform a first linear transformation that corresponds to a coefficient vector of a polynomial representing the input ciphertext CT to a plaintext slot, may perform an approximate operation on slot values, and may perform a second linear transformation that corresponds approximate values to the coefficient vector of the polynomial to generate the output ciphertext CT'. The bootstrapping circuit 45 may perform a linear transformation based on a rotation key and a conjugation key due to characteristics of the homomorphic encryption.

Referring to FIG. 4, when the 0th to Lth sub-output ciphertexts ct'(0) to ct'(L) are expressed by bits and moduli q0 to qL are squares of 2, lengths of the 0th to Lth sub-output ciphertexts ct'(0) to ct'(L) may be determined by the moduli q0 to qL. That is, the lengths of the 0th to Lth sub-output ciphertexts ct'(0) to ct'(L) may be $\log_2 q0$ to $\log_2 qL$.

FIG. 5 is a conceptual diagram illustrating a modulus switching operation according to embodiment of the inventive concept.

Referring to FIGS. 2 and 5, the modulus switching circuit 46 may generate a level-(k−1) output ciphertext CT' by changing a modulus for a level-k input ciphertext CT, wherein k is a positive integer less than or equal to L.

The level-k input ciphertext CT may include 0th to kth sub-input ciphertexts ct(0) to ct(k). The 0th to kth sub-input ciphertexts ct(0) to ct(k) may be values modular calculated based on 0th to kth moduli q0 to qk. In FIG. 5, a modulus of the input ciphertext CT may be understood as a product of the 0th to kth moduli q0 to qk.

The level-(k−1) output ciphertext CT' may include 0th to (k−1)th sub-output ciphertexts ct'(0) to ct'(k−1). The 0th to (k−1)th sub-output ciphertexts ct'(0) to ct'(k−1) may be values modular calculated based on the 0th to kth moduli q0 to qk. In FIG. 5, a modulus of the output ciphertext CT' may be understood as a product of 0th to (k−1)th moduli q0 to q (k−1). That is, the modulus switching circuit 46 may perform a modulus switching operation by reducing the modulus of the input ciphertext CT by qk. In some embodiments, lengths of the 0th to kth moduli q0 to qk may be equal to one another. Therefore, as a modulus switching operation is performed, a length of a ciphertext may be discretely reduced.

Here, the input ciphertext CT may be expressed by [Equation 5] that follows:

$$CT = ct(j)_{0 \leq j \leq k} = (c_0(j), c_1(j))_{0 \leq j \leq k}, \qquad [\text{Equation 5}]$$

wherein, per [Equation 3], $c_0(j)$ equals $v(x) \cdot b^{(j)}(x) + m(x) + e0(x)$, $v(x) \cdot a^{(j)}(x) + e1(x)$ and $c_1(j)$ equals $v(x) \cdot a^{(j)}(x) + e1(x)$ Thus, the output ciphertext CT' may be expressed by Equation 6 that follows:

$$CT = (ct'(j) = (c'_0(j), c'_1(j))_{0 \leq j \leq k-1}, \qquad [\text{Equation 6}]$$

wherein $c'_i^{(j)}$ (i=0 or 1) may be expressed by Equation 7 that follows:

$$c'_i^{(j)} = q_l^{-1} (c_i^{(j)} - c_i^{(k)})(\text{mod } q_j)(i=0,1), \qquad [\text{Equation 7}]$$

It follows that, referring to FIG. 5 and [Equation 6], a level of the output ciphertext CT' may be less than the level of the input ciphertext CT. That is, a length of the output ciphertext CT' may be less than a length of the input ciphertext CT.

Figure 6:
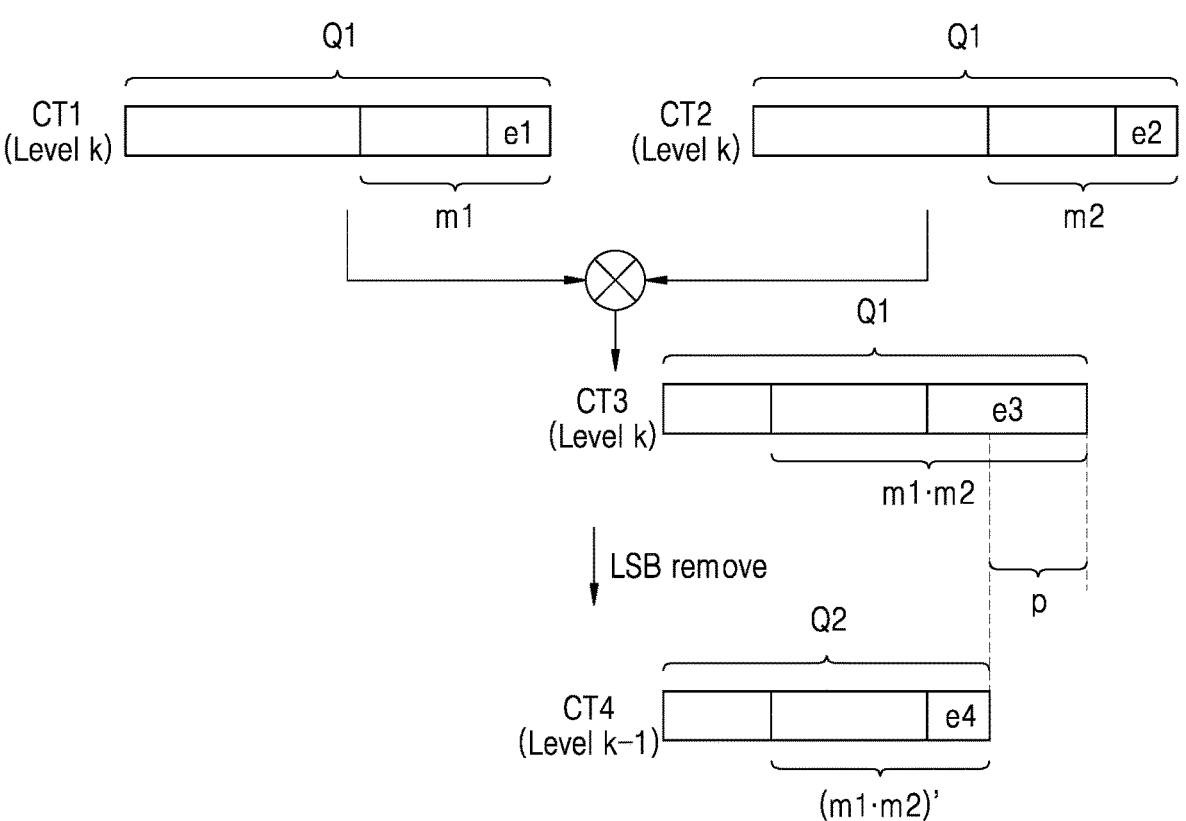
FIG. 6 is a view illustrating a multiplication operation according to an embodiment of the inventive concept.

FIG. 6 is a conceptual diagram illustrating a multiplication operation according to embodiments of the inventive concept.

Referring to FIGS. 1, 2 and 6, the memory controller 20 may generate a third ciphertext CT3 by performing a multiplication operation based on first and second ciphertexts CT1 and CT2 with a level k, where k is a positive integer. As illustrated in FIG. 6, the first ciphertext CT1 may be expressed as the sum of a bit string with a length Q1, a first plaintext m1, and a first error e1 and the second ciphertext CT2 may be expressed as the sum of the bit string with the length Q1, a second plaintext m2, and a second error e2.

The third ciphertext CT3 may be expressed as the sum of the bit string with the length Q1, a product m1*m2 of the first and second plaintexts, and a third error e3. A length of the third error e3 may be greater than a length of each of the first and second errors e1 and e2.

The modulus switching circuit 46 of FIG. 2 may perform a least significant bit (LSB) removing operation in order to reduce the length of the third error e3. The LSB removing operation may correspond to the modulus switching operation of FIG. 5. That is, the modulus switching circuit 46 may generate a fourth ciphertext CT4 with a level k−1 by removing p LSBs from the third ciphertext CT3. In the product m1*m2 of the first and second plaintexts, the p LSBs may have low reliability. Therefore, a value (m1*m2)' obtained by removing the p LSBs from the product m1*m2 of the first and second plaintexts may be valid bits.

The fourth ciphertext CT4 may be expressed as the sum of a bit string with a length Q2, the valid bits (m1*m2)' of the product m1*m2 of the first and second plaintexts, and a fourth error e4. A length of the fourth ciphertext CT4 may be Q2, and Q2 may be less than Q1 by p. Here, the modulus qL of FIG. 5 may correspond to a p square of 2.

Figure 7:
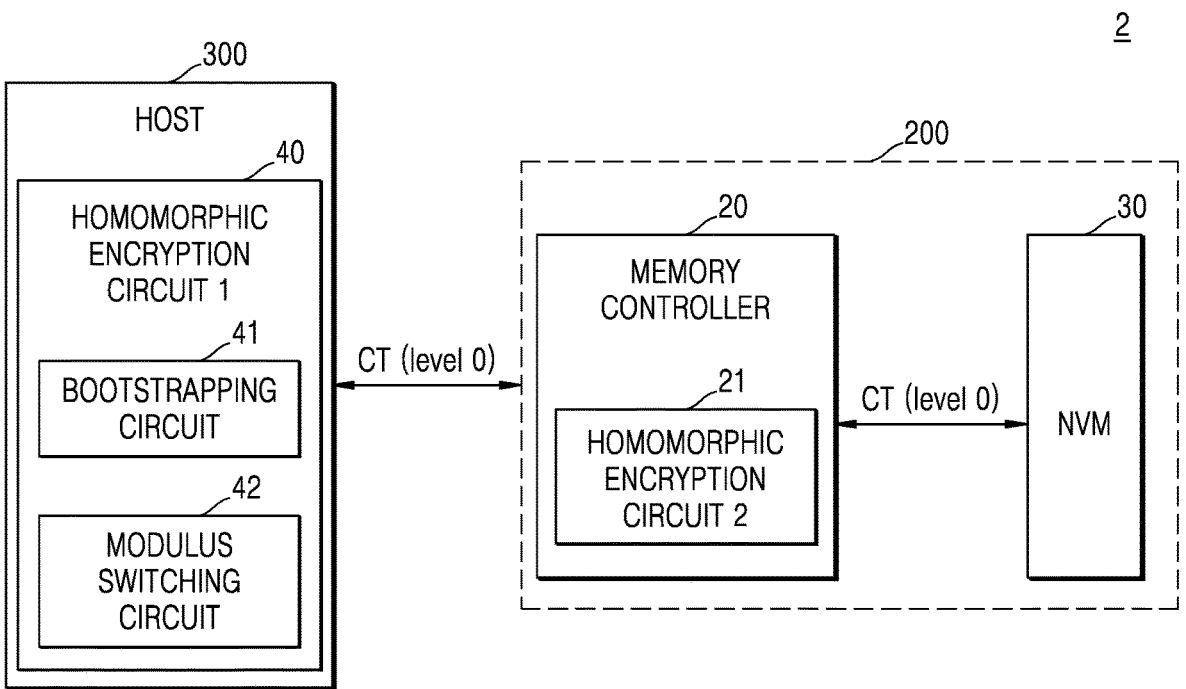
FIG. 7 is a block diagram illustrating a storage system according to an embodiment of the inventive concept.

FIG. 7 is a block diagram illustrating a storage system 2 according to embodiments of the inventive concept.

The storage system 2 may generally include a host 300 and a storage device 200. The host 300 may include a first homomorphic encryption circuit 40, and the first homomorphic encryption circuit 40 may include a bootstrapping circuit 45 and a modulus switching circuit 46.

The host 300 and the storage device 200 may communicate a level-0 ciphertext CT. The host 300 may bootstrap the level-0 ciphertext CT and may perform an operation based on the bootstrapped ciphertext. As shown in FIG. 4, the bootstrapping circuit 45 may bootstrap the level-0 ciphertext CT to a level-L ciphertext CT'. The host 300 may perform an operation (for example, a multiplication operation) on the level-L ciphertext CT'. As shown FIGS. 5 and 6, the modulus switching circuit 46 may reduce a level of a ciphertext by performing a modulus switching operation on the ciphertext generated by the operation.

Figure 8:
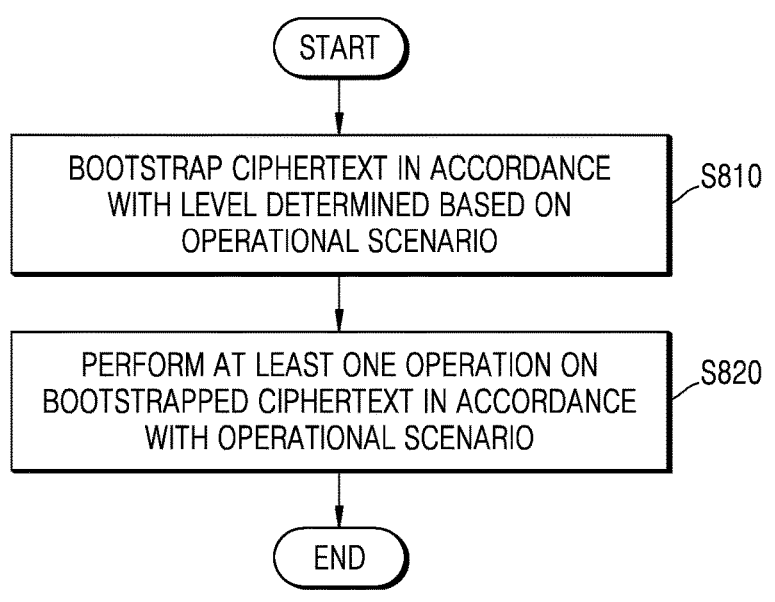
FIG. 8 is a flowchart illustrating a storage system operating method according to an embodiment of the inventive concept.
Figures 9, 10:
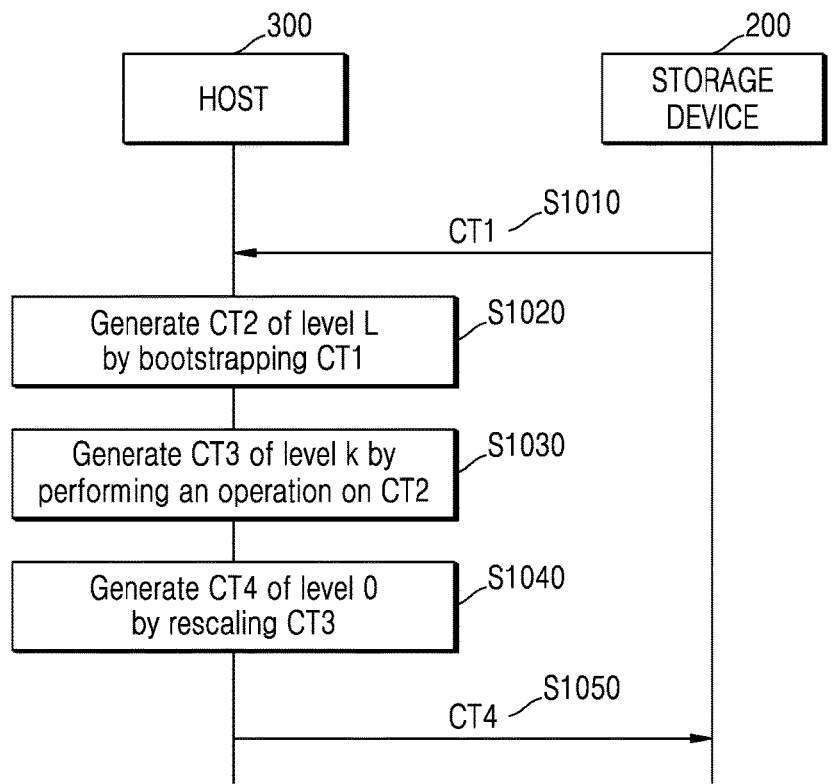
FIG. 9 is a view illustrating a bootstrapping level according to an embodiment of the inventive concept.
FIG. 10 is a view illustrating a storage system operating method according to an embodiment of the inventive concept.

FIG. 8 is a flowchart illustrating a storage system operating method according to embodiments of the inventive concept, and FIG. 9 is a table listing variable for various operational scenarios.

Referring to FIGS. 7, 8 and 9, the storage system operating method may include performing in the host 300, a bootstrapping operation on a ciphertext in accordance with a bootstrapping level determined based on an operational scenario (S810). In this regard, an operational scenario may denote one or more operations performed on the ciphertext. In some embodiments, a greater the number of multiplication operations included in the operational scenario may correspond with a higher bootstrapping level.

Here, the host 300 may store an operational scenario table (SNRT) (e.g., in the NVM). As an illustrated example, the operational scenario table SNRT of FIG. 9 includes first, second and third operational scenarios (e.g., SNR1, SNR2 and SNR3), however the number of operational scenarios is not limited thereto.

Multiplication operations may be performed first a number of times count 1 in the first operational scenario SNR1 and, when the multiplication operations are performed in the first operational scenario SNR1, a level of a ciphertext may be reduced by sL1. When the first operational scenario SNR1 is to be performed on the ciphertext, the bootstrapping circuit 45 may bootstrap the level of the ciphertext to L1. L1 may be equal to or greater than sL1.

Addition operations may be performed second a number of times count 2 in the second operational scenario SNR2 and, when the addition operations are performed in the second operational scenario SNR2, the level of the ciphertext may be reduced by sL2. When the second operational scenario SNR2 is to be performed on the ciphertext, the bootstrapping circuit 45 may bootstrap the level of the ciphertext to L2. L2 may be equal to or greater than sL2.

Multiplication and addition operations may be performed third a number of times count 3 in the third operational scenario SNR3 and, when the multiplication and addition operations are performed in the third operational scenario SNR3, the level of the ciphertext may be reduced by sL3. When the third operational scenario SNR3 is to be performed on the ciphertext, the bootstrapping circuit 45 may bootstrap the level of the ciphertext to L3. L3 may be equal to or greater than sL3.

The host 300 may then perform at least one operation on the bootstrapped ciphertext in accordance with an operational scenario (S820). In some embodiments, the host 300 may perform an operation of changing the level of the final ciphertext on which all the operations in accordance with the operational scenario are performed to 0. Alternately, in some embodiments, the host 300 may extract only the 0th subciphertext ct(0) described based on FIG. 3 from the final ciphertext and may provide the 0th sub-ciphertext ct(0) to the storage device 200.

FIG. 10 is a conceptual diagram further illustrating a storage system operating method according to embodiments of the inventive concept.

Referring to FIGS. 7, and 10, the storage system operating method may include providing the first ciphertext CT1 from the storage device 200 to the host 300 (S1010). Here, the first ciphertext CT1 may be a level-0 homomorphic ciphertext read from the NVM.

The host 300 may then generate a second ciphertext CT2 with a level L by bootstrapping the first ciphertext CT1 (S1020). In some embodiments, the host 300 may adaptively determine a bootstrapping level in accordance with an operational scenario, such as for example, the operational scenarios of FIGS. 8 and 9.

The host 300 may then generate a third ciphertext CT3 with a level k by performing at least one operation on the second ciphertext CT2 (S1030). That is, the host 300 may perform at least one predetermined operation on the third ciphertext CT3. In some embodiments, the host 300 may perform at least one operation in accordance with an operational scenario, such as for example, the operational scenarios of FIGS. 8 and 9. Here, k may be less than L, and may be 0 or a positive integer. In some embodiments, when the level k is 0, the host 300 may store the third ciphertext CT3 in the storage device 200 by providing the third ciphertext CT3 to the storage device 200. When the level k is a positive integer less than L, operation S1040 may be performed.

The host 300 may then generate the fourth ciphertext CT4 with a level 0 by rescaling the third ciphertext CT3 (S1040). In some embodiments, the host 300 may extract the 0th sub-ciphertext ct(0) from the third ciphertext CT3 and may use the extracted 0th sub-ciphertext ct(0) as the fourth ciphertext CT4.

Then, the host 300 may store the fourth ciphertext CT4 in the storage device 200 (S1050). However, because a level of the fourth ciphertext CT4 is 0, the host 300 may provide a ciphertext with the smallest length (or length) in which the ciphertext may be decrypted to the storage device 200 so that a ciphertext transfer rate may increase.

Figure 11:
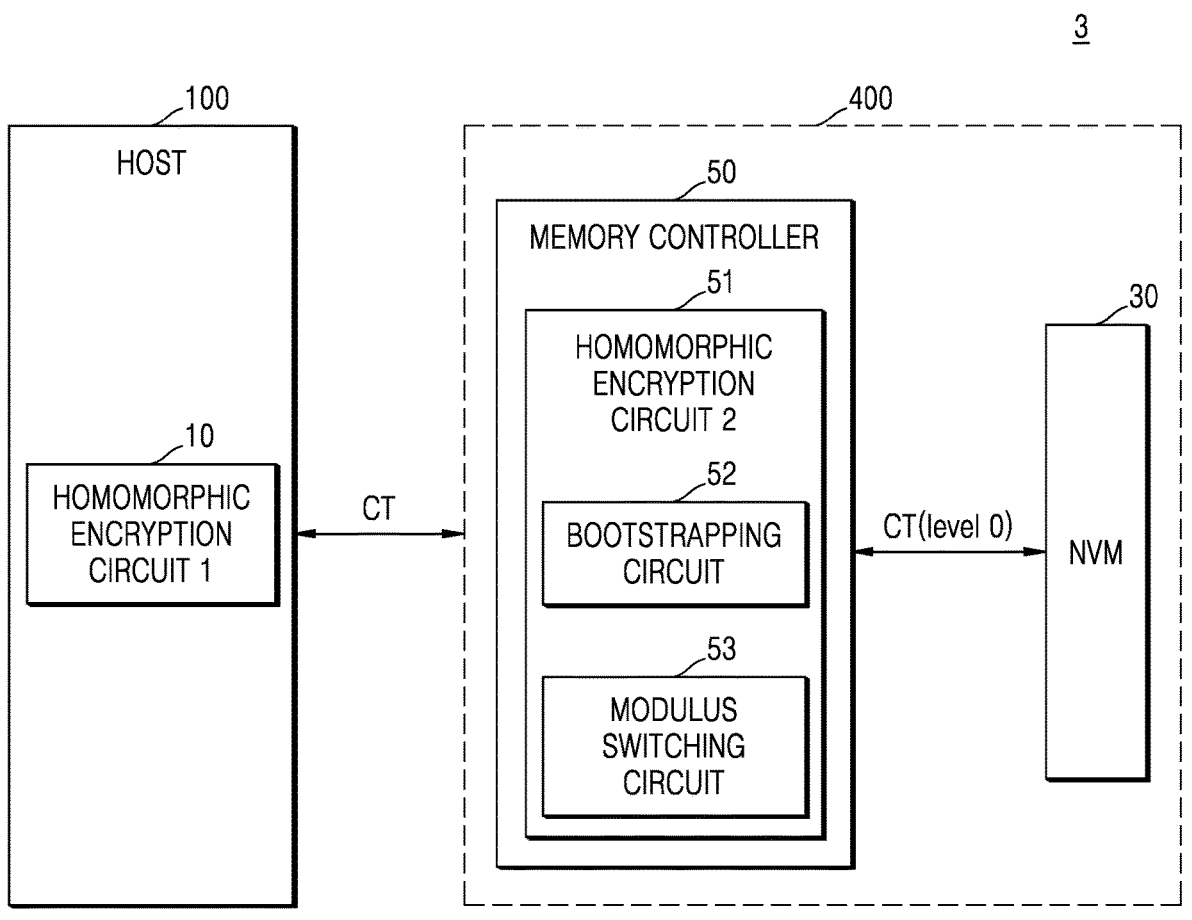
FIG. 11 is a block diagram illustrating a storage system according to an embodiment of the inventive concept.

FIG. 11 is a block diagram illustrating a storage system 3 according to embodiments of the inventive concept.

Referring to FIG. 11, the storage system 3 may generally include a host 100 and a storage device 400, wherein the storage device 400 may include a memory controller 50 and NVM 30. The memory controller 50 may include a second homomorphic encryption circuit 51, and the second homomorphic encryption circuit 51 may include a bootstrapping circuit 52 and a modulus switching circuit 53.

The host 100 and the storage device 400 may communicate a ciphertext CT. A level of the ciphertext CT may vary. In some embodiments, the host 100 and the storage device 400 may communicate the level-0 ciphertext CT so that a data transfer rate may increase.

In some embodiments, the memory controller 50 may bootstrap the level-0 ciphertext CT and may perform an operation based on the bootstrapped ciphertext CT. By performing a modulus switching operation after a multiplication operation, the level of the ciphertext may be reduced. In some embodiments, the memory controller 50 may extract only the 0th sub-ciphertext ct(0) described based on FIG. 3 from the final ciphertext corresponding to the operation result and may provide the 0th sub-ciphertext ct(0) to the NVM 30 or the host 100.

In some embodiments, the memory controller 50 may decrypt the level-0 ciphertext CT to a plaintext PT. The memory controller 50 may perform an operation on the plaintext PT and may encrypt a plaintext PT' corresponding to the operation result to a level-0 homomorphic ciphertext CT'. The memory controller 50 may provide the level-0 homomorphic ciphertext CT' to the host 100.

Figure 12:
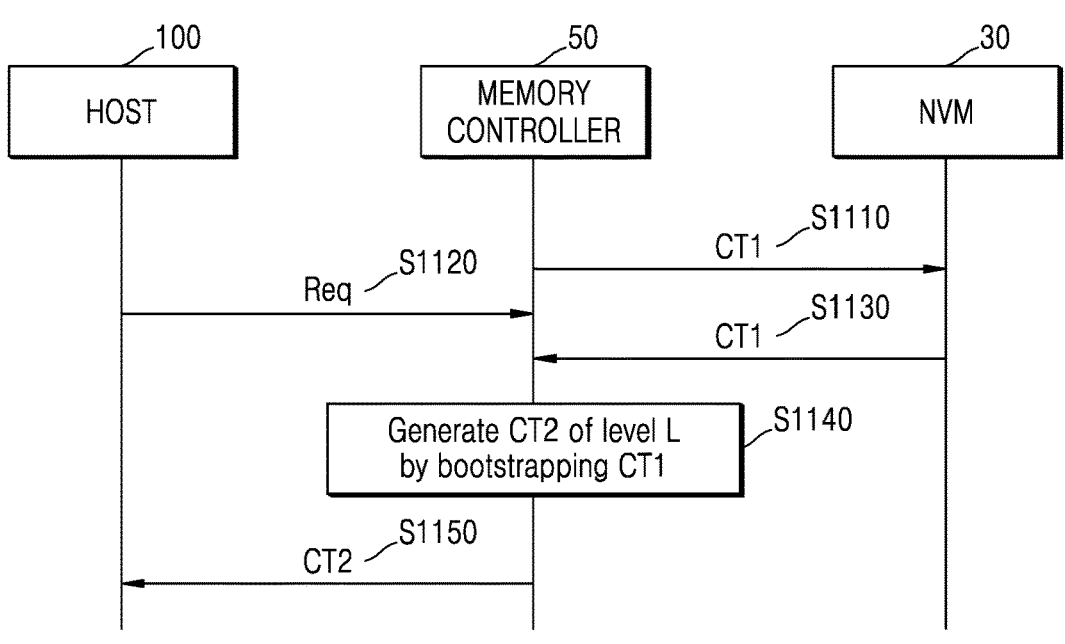
FIG. 12 is a view illustrating a storage system operating method according to an embodiment of the inventive concept.

FIG. 12 is a conceptual diagram further illustrating a storage system operating method according to embodiments of the inventive concept.

Referring to FIGS. 11 and 12, in the illustrated storage system operating method, the memory controller 50 may store the first ciphertext CT1 in the NVM 30 (S1110). A level of the first ciphertext CT1 may be 0. In some embodiments, the memory controller 50 may receive the first ciphertext CT1 from the host 100. In some embodiments, the memory controller 50 may generate the first ciphertext CT1 by receiving a plaintext PT from the host 100 and encrypting the plaintext PT based on a homomorphic encryption algorithm.

The host 100 may request the first ciphertext CT1 from the memory controller 50 (S1120), and the memory controller 50 may read the first ciphertext CT1 from the NVM 30 (S1130). Here, the read first ciphertext CT1 may be temporarily stored in a volatile memory (e.g., a dynamic random access memory (DRAM) associated with the memory controller 50).

The memory controller 50 may generate the second ciphertext CT2 with a level L (wherein L is an integer not less than 2) by bootstrapping the first ciphertext CT1 (S1140). That is, the first ciphertext CT1 may correspond to the input ciphertext CT of FIG. 4 and the second ciphertext CT2 may correspond to the output ciphertext CT' of FIG. 4.

The memory controller 50 may provide the second ciphertext CT2 to the host 100 (S1150). In some embodiments, after operation S1150, the host 100 may perform at least one operation based on the second ciphertext CT2. The host 100 may obtain a plaintext PT by decrypting a ciphertext corresponding to the at least one operation result.

Figure 13:
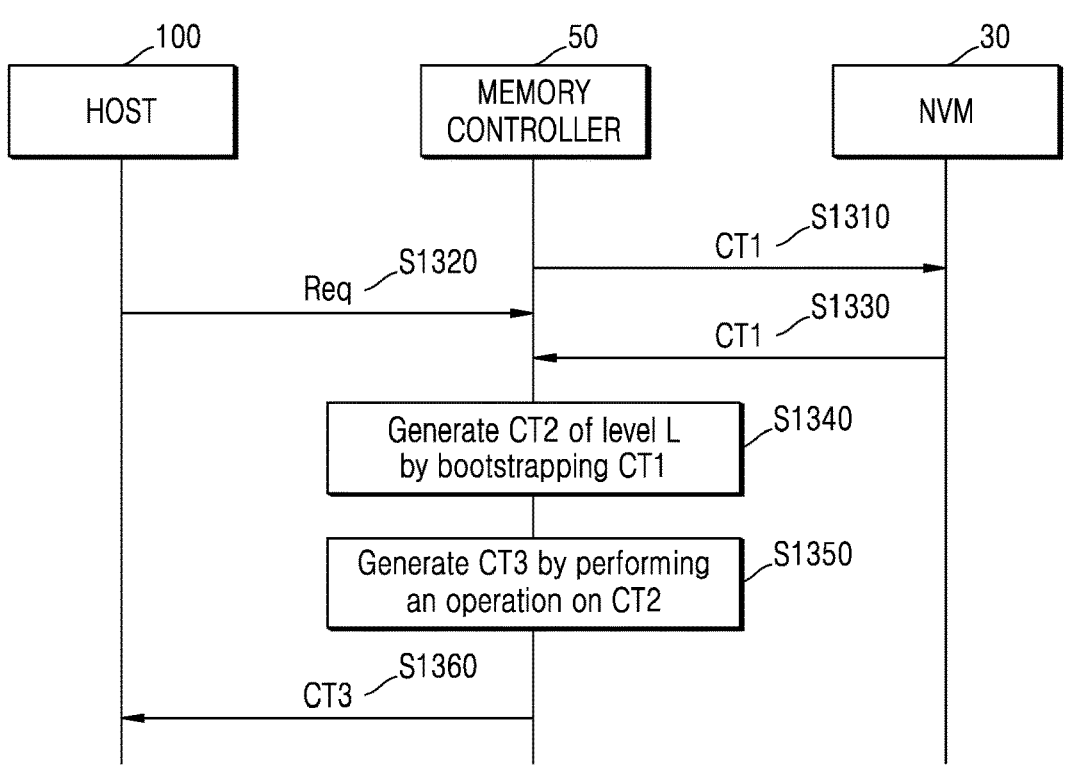
FIG. 13 is a view illustrating a storage system operating method according to an embodiment of the inventive concept.

FIG. 13 is a conceptual diagram further illustrating a storage system operating method according to embodiments of the inventive concept.

Referring to FIGS. 10 and 13, the memory controller 50 may store the first ciphertext C1 in the NVM 30 (S1310). Thereafter, the host 100 may issue a request to the memory controller 50 to retrieve the first ciphertext C1 from the NVM 30 (S1320), wherein the request may include information related to operations to be performed on the first ciphertext CT1. For example, the request may include information, such as for example, the first, second and third operational scenarios (SNR1, SNR2 and SNR3) of FIG. 8. In response to the request, the memory controller 50 may retrieve (or read) the first ciphertext C1 from the NVM 30 (S1330).

The memory controller 50 may then generate the second ciphertext CT2 of level L by bootstrapping the first ciphertext CT1 (S1340), and generate the third ciphertext CT3 by performing at least one operation on the second ciphertext CT2 in accordance with an operational scenario. Here, a level of the third ciphertext CT3 may be lower than that of the second ciphertext CT2.

Then, the memory controller 50 may provide the third ciphertext CT3 to the host 100 (S1360), and the host 100 may obtain plaintext PT by decrypting the third ciphertext CT3.

Figure 14:
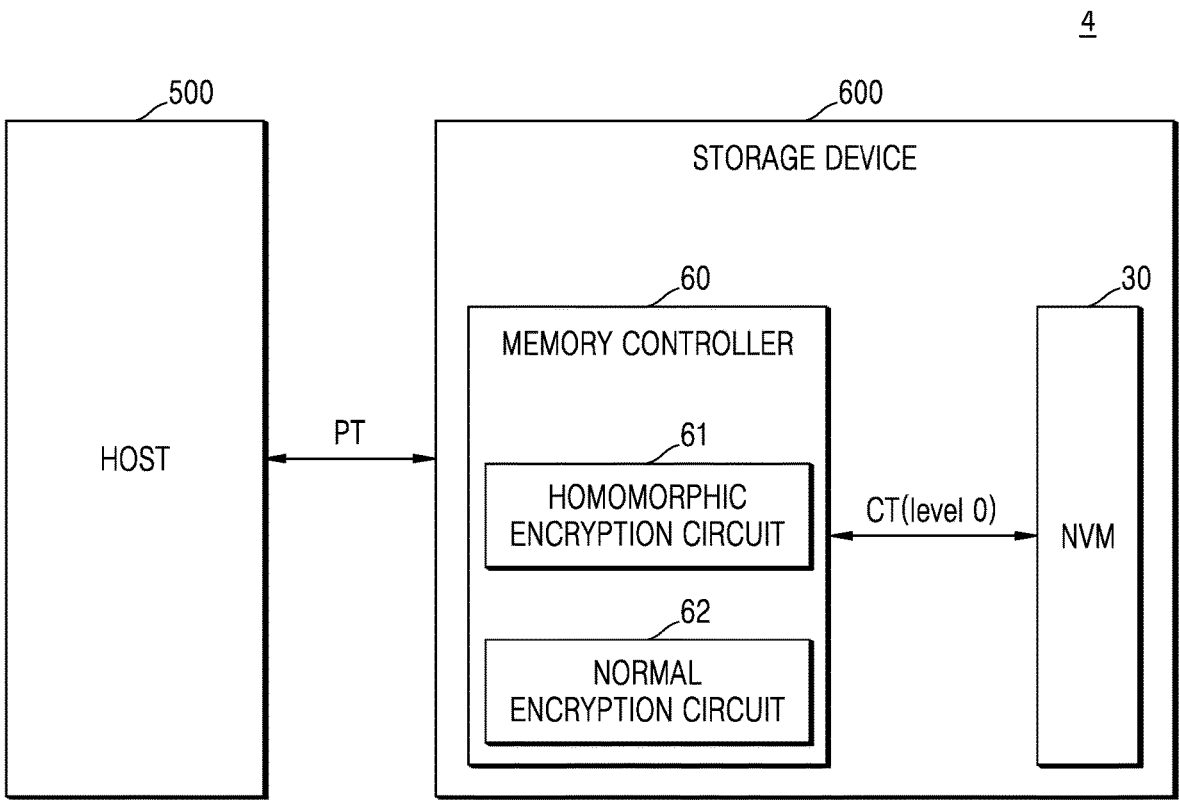
FIG. 14 is a block diagram illustrating a storage system according to an embodiment of the inventive concept.

FIG. 14 is a block diagram illustrating a storage system 4 according to embodiments of the inventive concept.

Referring to FIG. 14, the storage system 4 may generally include a host 500 and a storage device 600, however, the host 500 is assumed to not include a homomorphic encryption circuit. The storage device 600 may include a memory controller 60 and NVM 30.

The host 500 and the storage device 600 may communicate a plaintext PT. In some embodiments, the host 500 and the storage device 600 may communicate the message vector z, that is, the input data described above with reference to FIG. 2.

The memory controller 60 may include a homomorphic encryption circuit 61 and a normal encryption circuit 62. The homomorphic encryption circuit 61 may be an embodiment of the homomorphic encryption circuit 40 described above with reference to FIG. 2. The normal encryption circuit 62 may encrypt the plaintext PT based on not a homomorphic encryption algorithm but a normal encryption algorithm. For example, the normal encryption algorithm may be a symmetric key algorithm or an asymmetric key algorithm. The normal encryption algorithm may provide higher encryption performance than the homomorphic encryption algorithm. The normal encryption algorithm may include an advanced encryption standard (AES) algorithm, a data encryption standard (DES) algorithm, the Rivest-Shamir-Adleman (RSA) algorithm, a message-digest (MD) algorithm, or a secure hash (SHA) algorithm.

The memory controller 60 may encrypt the plaintext PT based on the homomorphic encryption algorithm or the normal encryption algorithm based on whether an operation is to be performed in a state in which the plaintext PT is encrypted.

Thus, when the operation is to be performed in the state in which the plaintext PT is encrypted, the homomorphic encryption circuit 61 may encrypt the plaintext PT. Alternately, when the operation is not to be performed in the state in which the plaintext PT is encrypted, the normal encryption circuit 62 may encrypt the plaintext PT.

Figure 15:
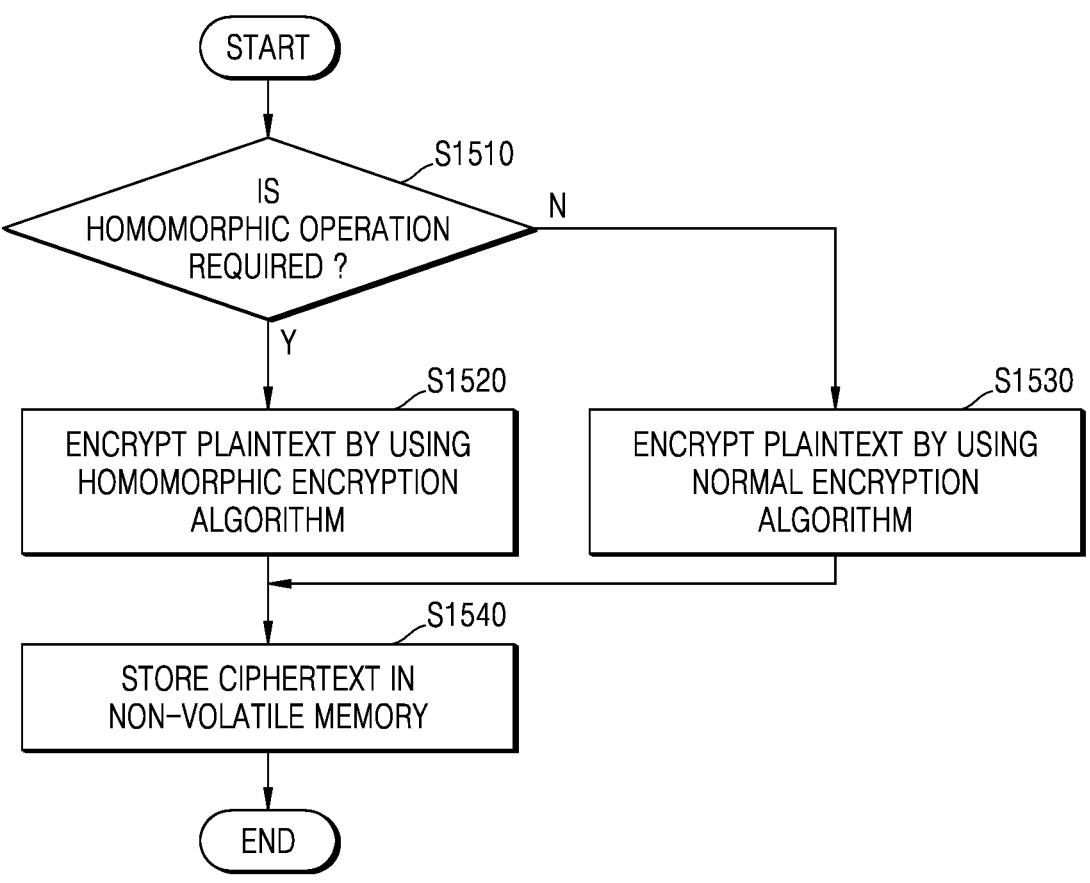
FIG. 15 is a flowchart illustrating a storage device operating method according to an embodiment of the inventive concept.

FIG. 15 is a flowchart illustrating a storage device operating method according to embodiments of the inventive concept.

Referring to FIGS. 14 and 15, the storage device 600 may determine whether a homomorphic operation is required for the plaintext PT (S1510). In some embodiments, the storage device 600 may receive a field representing whether the homomorphic operation is required for the plaintext PT from the host 500 and may identify the corresponding field in order to determine whether the homomorphic operation is required for the plaintext PT.

If the homomorphic operation is required for the plaintext PT (S1510=Yes), then the plaintext PT may be encrypted using the homomorphic operation (S1250). That is, the storage device 600 may encrypt the plaintext PT using a homomorphic encryption algorithm (e.g., as implemented, for example, by the homomorphic encryption circuit 61. In this manner, the homomorphic encryption circuit 61 may be used to generate a level-0 homomorphic ciphertext.

If, however, the homomorphic operation is not required for the plaintext PT (S1510=No), then the storage device 600 may encrypt the plaintext PT using a normal (i.e., a non-homomorphic) encryption algorithm (S1530). Here, use of the normal encryption algorithm may result in a higher encryption speed than use of the homomorphic encryption algorithm.

Regardless of encryption approach, the storage device 600 may then store the ciphertext in the NVM 30 (S1540).

Thus, according to certain embodiments of the inventive concept, because either a homomorphic encryption algorithm or a normal encryption algorithm may be selectively used in accordance with a prior determination of homomorphic operation in relation to the plaintext PT, an optimal encryption speed may be achieved.

Figure 16:
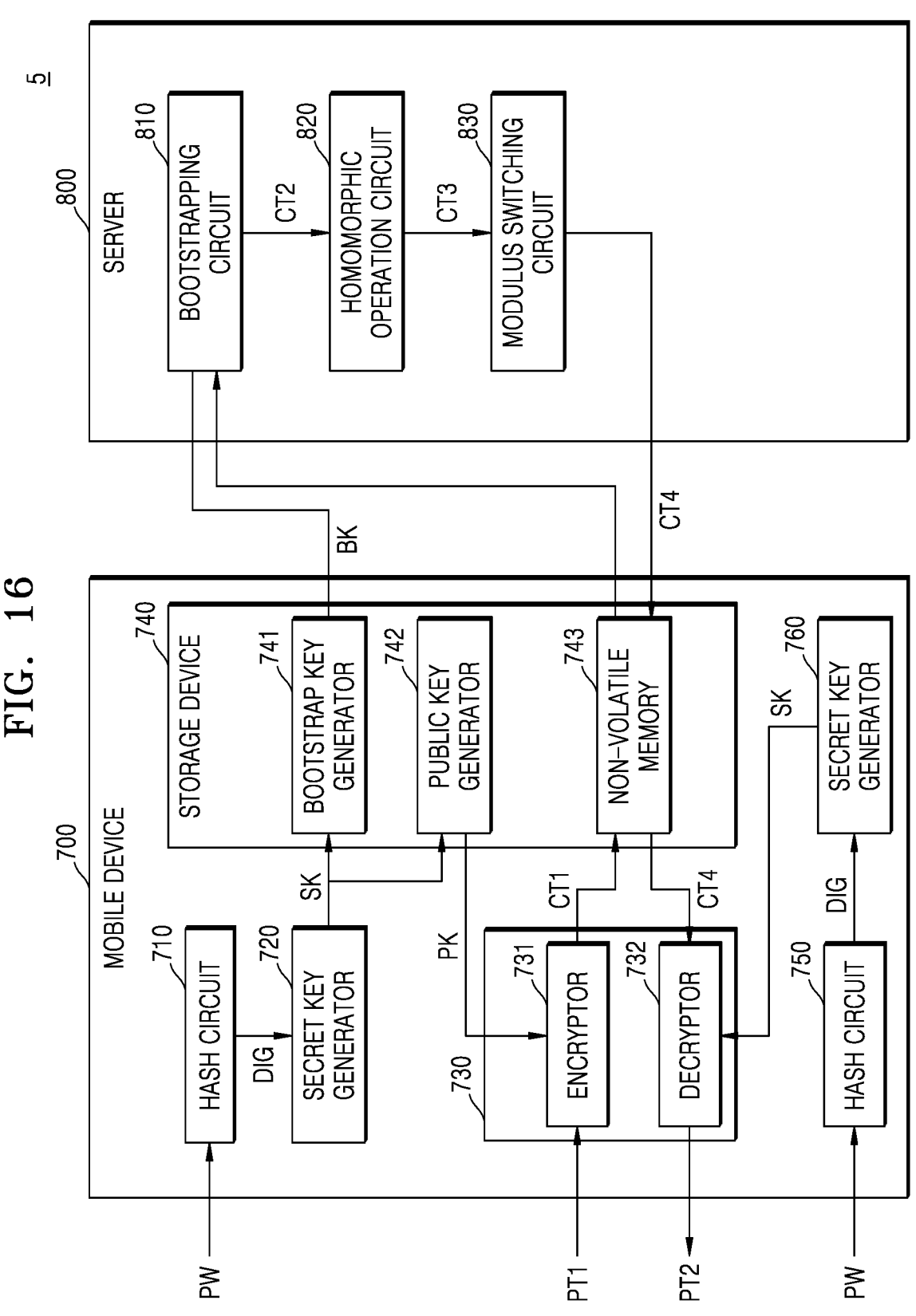
FIG. 16 is a block diagram illustrating a computing system according to an embodiment of the inventive concept.

FIG. 16 is a block diagram illustrating a computing system 5 according to embodiments of the inventive concept.

Referring to FIG. 16, the computing system 5 may generally include a mobile device 700 and a server 800. Here, the mobile device 700 is assumed to be a portable computing system, such as a mobile phone, a wearable device, a laptop computer, etc. The server 800 may provide a result of the homomorphic operation to the mobile device 700 in response to a request of the mobile device 700.

The mobile device 700 may include first and second hash circuits 710 and 750, first and second secret key generators 720 and 760, a homomorphic encryption circuit 730, and a storage device 740.

The first hash circuit 710 may receive a password PW and may generate a digest DIG corresponding to the password PW based on a hash algorithm. The digest DIG may have a fixed length regardless of a length of the password PW.

The first secret key generator 720 may generate a secret key SK based on the digest DIG. The first secret key generator 720 may provide the secret key SK to the storage device 740.

The storage device 740 may include a bootstrap key generator 741, a public key generator 742, and NVM 743. However, the inventive concept is not limited thereto, and some components of the storage device 740 may be provided outside the storage device 740.

The bootstrap key generator 741 may generate a bootstrap key BK based on the secret key SK. The bootstrap key BK may include a rotation key and a conjugation key. The public key generator 742 may generate a public key PK based on the secret key SK.

The homomorphic encryption circuit 730 may include an encryptor 731 and a decryptor 732. The encryptor 731 may receive a first plaintext PT1 and may generate a first ciphertext CT1 based on the public key PK. For example, the first plaintext PT1 may include personal information, such as the age, gender, and blood pressure of a user of the mobile device 700. The first ciphertext CT1 may be a level-0 homomorphic ciphertext. The first ciphertext CT1 may be stored in the NVM 743. The first ciphertext CT1 may be provided to the server 800 for the homomorphic operation.

The server 800 may include a bootstrapping circuit 810, a homomorphic operation circuit 820, and a modulus switching circuit 830. The server 800 may perform the homomorphic operation on the first ciphertext CT1 and may provide a fourth ciphertext CT4 generated as a result of the homomorphic operation to the mobile device 700.

The bootstrapping circuit 810 may generate a second ciphertext CT2 by bootstrapping the first ciphertext CT1 based on the bootstrap key BK. A level of the second ciphertext CT2 may be greater than 0.

The homomorphic operation circuit 820 may generate a third ciphertext CT3 by performing the homomorphic operation on the second ciphertext CT2. The homomorphic operation may include a multiplication operation, an addition operation, a comparison operation, or a modular operation. For example, the third ciphertext CT3 may represent a hypertension probability calculated based on the personal information of the user. A level of the third ciphertext CT3 may be lower than that of the second ciphertext CT2. When the level of the third ciphertext CT3 is 0, the third ciphertext CT3 may be provided to the mobile device 700. When the level of the third ciphertext CT3 is not 0, the modulus switching circuit 830 may generate the fourth ciphertext CT4 by changing the level of the third ciphertext CT3 to 0. The fourth ciphertext CT4 may be provided to the mobile device 700. That is, the server 800 provides a homomorphic ciphertext corresponding to a level 0 to the mobile device 700 so that a data transfer rate may increase.

The fourth ciphertext CT4 may be stored in the NVM 743. The mobile device 700 may receive the password PW again from the user in order to provide a second plaintext PT2 corresponding to the fourth ciphertext CT4.

The second hash circuit 750 may generate the digest DIG corresponding to the password PW based on the hash algorithm, and the second secret key generator 760 may generate the secret key SK based on the digest DIG. The first secret key generator 720 and the second secret key generator 760 may generate the same secret key SK.

The decryptor 732 may generate the second plaintext PT2 by decrypting the fourth ciphertext CT4 based on the secret key SK, and the mobile device 700 may output the second plaintext PT2.

Figure 17:
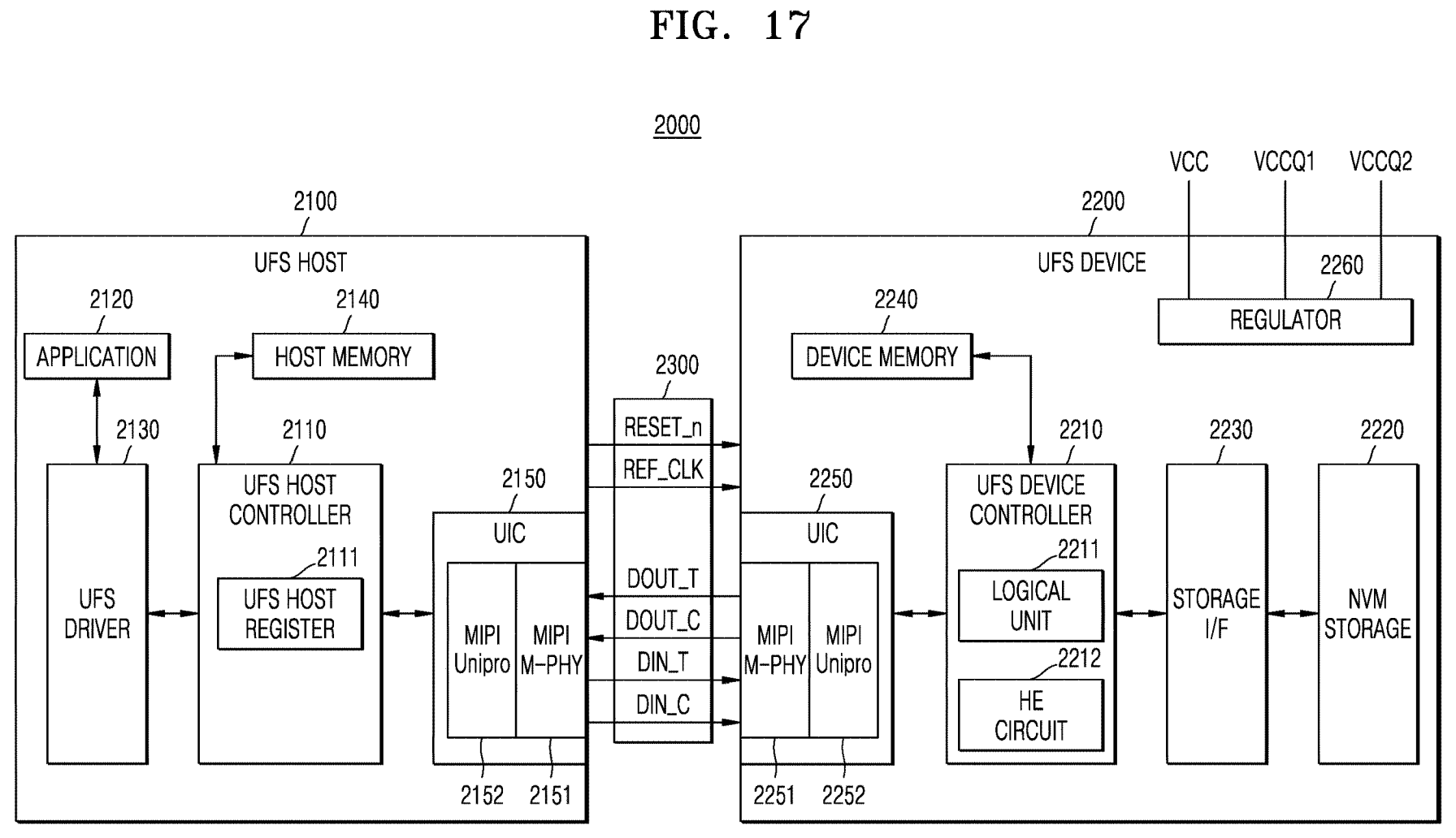

FIG. 17 is a block diagram illustrating a universal flash storage (UFS) system 2000 according to embodiments of the inventive concept. The UFS system 2000 may be a system conforming to a one or more UFS standard(s), as conventionally-understood and commercially-available through the Joint Electron Device Engineering Council (JEDEC). Accordingly, the UFS system 200 includes a UFS host 2100, a UFS device 2200, and a UFS interface 2300. Here, any one or more of the storage systems 1, 2, 3, and 4 previously described above in relation to FIGS. 1, 7, 11, and 14 may be applied to the UFS system 2000.

Referring to FIG. 17, the UFS host 2100 may be connected to the UFS device 2200 through the UFS interface 2300. The UFS host 2100 may be implemented as a portion of the AP.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may communicate input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and communicate the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may communicate the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI Uni-Pro 2152, and the UIC layer 2250 on the side of the UFS device 2200 may also include an MIPI M-PHY 2251 and an MIPI Uni-Pro 2252.

The UFS interface 2300 may include a line configured to communicate a reference clock signal REF_CLK, a line configured to communicate a hardware reset signal RESET_n for the UFS device 2200, a pair of lines configured to communicate a pair of differential input signals DIN_t and DIN_c, and a pair of lines configured to communicate a pair of differential output signals DOUT_t and DOUT_c.

A frequency of a reference clock signal REF_CLK provided from the UFS host 2100 to the UFS device 2200 may be one of 19.2 MHz, 26 MHz, 38. 4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate clock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 17, a pair of lines configured to communicate a pair of differential input signals DIN_T and DIN_C may constitute a receiving lane, and a pair of lines configured to communicate a pair of differential output signals DOUT_T and DOUT_C may constitute a transmission lane. Although one transmission lane and one receiving lane are illustrated in FIG. 17, the number of transmission lanes and the number of receiving lanes may be changed.

The receiving lane and the transmission lane may communicate data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may communicate data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be communicated through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a length in a predetermined range. For example, a minimum length of the logical block may be set to 4 Kbyte.

When a command from the UFS host 2100 is applied through the UIC layer 2250 to the UFS device 2200, the UFS device controller 2210 may perform an operation in response to the command and communicate a completion response to the UFS host 2100 when the operation is completed.

As an example, when the UFS host 2100 intends to store user data in the UFS device 2200, the UFS host 2100 may communicate a data storage command to the UFS device 2200. When a response (a 'ready-to-transfer' response) indicating that the UFS host 2100 is ready to receive user data (ready-to-transfer) is received from the UFS device 2200, the UFS host 2100 may communicate user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may communicate a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. In addition, the UFS device controller 2210 may communicate user data, which is temporarily stored in the device memory 2240, to the UFS host 2100. In addition, the UFS device controller 2210 may further include an AES engine (not shown). The AES engine may perform at least of an encryption operation and a decryption operation on data communicated to the UFS device controller 2210 by using a symmetric-key algorithm.

The UFS device controller 2210 according to an embodiment of the inventive concept may include a homomorphic encryption circuit 2212. The homomorphic encryption circuit 2212 may generate a level-0 homomorphic ciphertext. The homomorphic encryption circuit 2212 may encrypt a plaintext received through the pair of differential input signals DIN_T and DIN_C to the level-0 homomorphic ciphertext. The level-0 homomorphic ciphertext may be stored in the NVM 2220 through the storage interface 2230. The homomorphic encryption circuit 2212 may generate a homomorphic ciphertext with a level L (L is an integer greater than 0) by bootstrapping the level-0 homomorphic ciphertext and may perform a homomorphic operation on the level-L homomorphic ciphertext. The UFS storage 2200 may provide the level-0 homomorphic ciphertext to the UFS host 2100 through the pair of differential output signals DOUT_T and DOUT_C.

The UFS host 2100 may sequentially store commands, which are to be communicated to the UFS device 2200, in the UFS host register 2111, which may serve as a common queue, and sequentially communicate the commands to the UFS device 2200. In this case, even while a previously communicated command is still being processed by the UFS device 2200, that is, even before receiving a notification that the previously communicated command has been processed by the UFS device 2200, the UFS host 2100 may communicate a next command, which is on standby in the CQ, to the UFS device 2200. Therefore, the UFS device 2200 may also receive a next command from the UFS host 2100 during the processing of the previously communicated command. A maximum number (or queue depth) of commands that may be stored in the CQ may be, for example, 32. Also, the CQ may be implemented as a circular queue in which a start and an end of a command line stored in a queue are respectively indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 18:
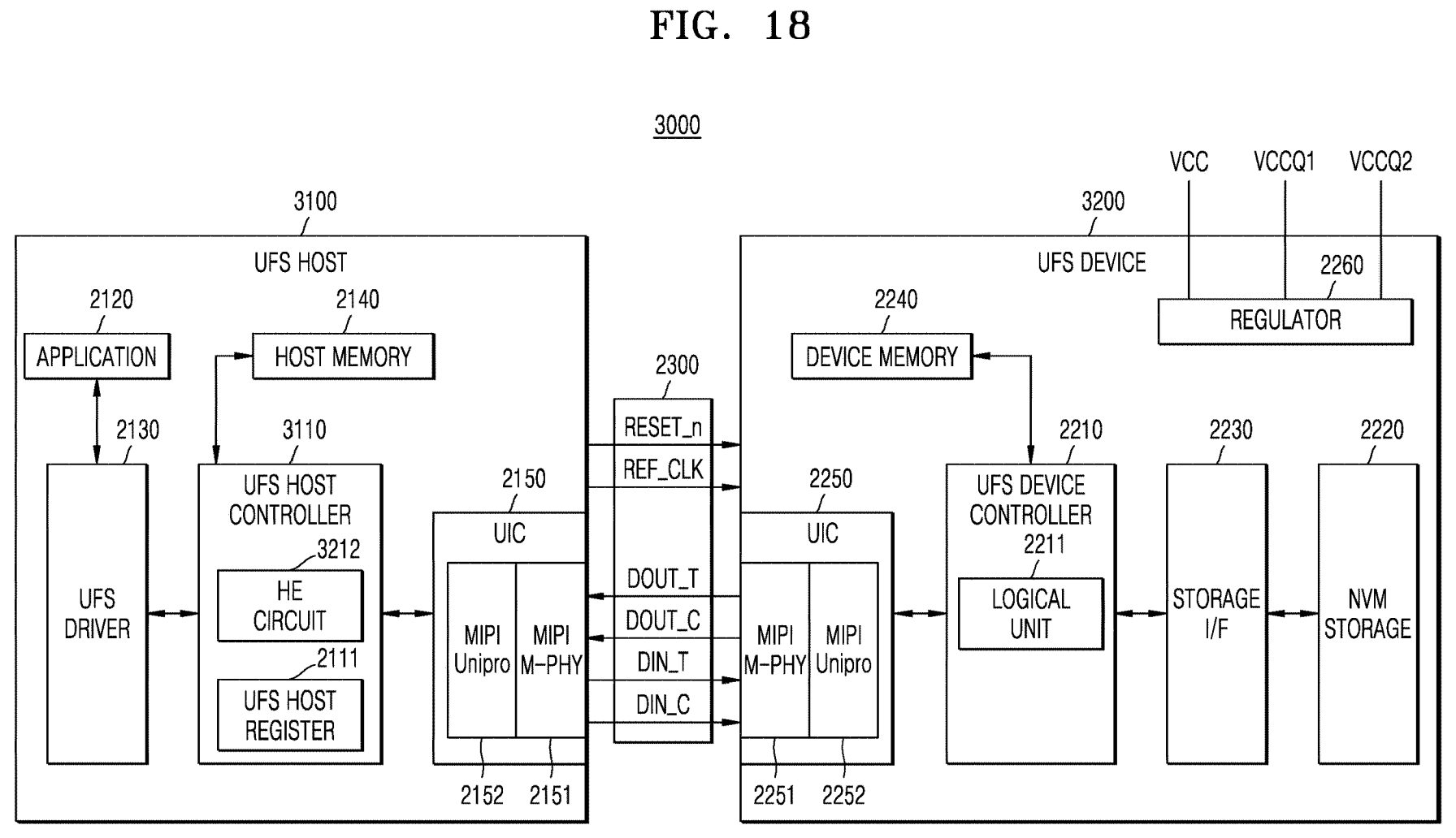

FIG. 18 is a block diagram illustrating a UFS system 3000 according to embodiments of the inventive concept.

Here, a UFS host 3100 of the UFS system 3000 may include a UFS host controller 3110. The UFS host controller 3110 may include a homomorphic encryption circuit 3212. The homomorphic encryption circuit 3212 may encrypt a plaintext received from the UFS driver 2130 to a level-0 homomorphic ciphertext. The UFS host 3100 may provide the level-0 homomorphic ciphertext to a UFS storage 3200 through the pair of differential input signals DIN_T and DIN_C.

The homomorphic encryption circuit 3212 may generate a homomorphic ciphertext with a level L (L is an integer greater than 0) by bootstrapping the level-0 homomorphic ciphertext and may perform a homomorphic operation on the level-L homomorphic ciphertext. In some embodiments, as illustrated in FIG. 17, the UFS device controller 2210 may include the homomorphic encryption circuit 2212.

FIG. 19 is a block diagram illustrating a computing system 4000 according to embodiments of the inventive concept.

Referring to FIG. 19, the computing system 4000 may include a host 4100, a storage controller 4210, and NVM 4220. The storage controller 4210 and the NVM 4220 may be included in a storage device.

The host 4100 may include a digital signal processor 4110, a neural processing unit 4120, an interface circuit 4130, a first homomorphic encryption circuit 4140, a communication module 4150, and a graphics processing unit (GPU)/central processing unit (CPU) 4160.

The digital signal processor 4110 may perform an operation on a digital signal obtained by converting an analog signal. The neural processing unit 4120 may perform machine learning and inference based on an artificial neural network.

The interface circuit 4130 may provide and receive data to and from the storage controller 4210. In some embodiments, the interface circuit 4130 may communicate/receive a level-0 homomorphic ciphertext.

The first homomorphic encryption circuit 4140 may encrypt a plaintext to the level-0 homomorphic ciphertext. In some embodiments, the first homomorphic encryption circuit 4140 may bootstrap the level-0 homomorphic ciphertext and may perform a homomorphic operation based on the bootstrapped ciphertext. In some embodiments, a bootstrap key for bootstrapping may be communicated from the storage controller 4210 to the host 4100 through the interface circuit 4130.

The communication module 4150 may include a 3G, 4G, long term evolution (LTE), 5G, or wireless communication module. The GPU/CPU 4160 may include at least one core processing an instruction and may control an overall operation of the host 4100.

The storage controller 4210 may include an interface circuit 4211, a CPU 4212, static RAM (SRAM) 4213, a second homomorphic encryption circuit 4214, and a NAND interface circuit 4215, and the NAND interface circuit 4215 may communicate data to/from the NVM 4220.

The interface circuit 4211 may receive a request from the host 4100, may perform an operation corresponding to the request, and may communicate a response to the host 4100. The interface circuit 4211 and the CPU 4212 may include at least one core processing an instruction and may control an overall operation of the storage controller 4210. The SRAM 4213 may temporarily store the data processed by the CPU 4212.

The second homomorphic encryption circuit 4214 may encrypt a plaintext to a level-0 homomorphic ciphertext. In some embodiments, the second homomorphic encryption circuit 4214 may bootstrap the level-0 homomorphic ciphertext and may perform a homomorphic operation based on the bootstrapped ciphertext. In some embodiments, the level-0 homomorphic ciphertext generated by the second homomorphic encryption circuit 4214 may be stored in the NVM 4220 through the NAND interface circuit 4215.

While the inventive concept has been particularly shown and described with reference to embodiments thereof, it will be understood that various changes in form and details may be made therein without departing from the spirit and scope of the following claims.

What is claimed is:

1. A storage device comprising:
non-volatile memory; and
a memory controller configured to
    encrypt a plaintext to generate a first homomorphic ciphertext with a first level among homomorphic ciphertexts with different levels, wherein a level of the homomorphic ciphertexts is directly proportional to maximum number of operations that can be performed on the homomorphic ciphertexts while preserving decryptability of homomorphic ciphertexts, and wherein the level of the homomorphic ciphertexts is directly proportional to a length of the homomorphic ciphertexts, store the first homomorphic ciphertext with the first level in the non-volatile memory, provide the first homomorphic ciphertext with the first level to a host in response to a request received from the host, change a second homomorphic ciphertext with a second level to the second homomorphic ciphertext with the first level, wherein the second level is greater than the first level, and store the second homomorphic ciphertext with the first level in the non-volatile memory, wherein each of the first and second homomorphic ciphertexts with the first level has a smallest length among the homomorphic ciphertexts with different levels.

2. The storage device of claim 1, wherein a result of a multiplication operation between the first homomorphic ciphertext with the first level and another homomorphic ciphertext is not decryptable.

3. The storage device of claim 1, wherein at least one of the homomorphic ciphertexts with different levels is generated by a modular operation performed in accordance with a plurality of moduli, and the memory controller is further configured to generate the first homomorphic ciphertext with the first level by performing the modular operation in accordance with a smallest modulus among the plurality of moduli.

4. The storage device of claim 1, wherein the memory controller is further configured to bootstrap the first homomorphic ciphertext with the first level to generate the second homomorphic ciphertext with a second level and provide the second homomorphic ciphertext with the second level in response to a request received from the host, and a result of a multiplication operation on the second homomorphic ciphertext with the second level is decryptable.

5. The storage device of claim 1, wherein the memory controller is further configured to bootstrap the first homomorphic ciphertext with the first level to generate a third homomorphic ciphertext with a third level different from the first level among the different levels, and perform at least one operation between the third homomorphic ciphertext with the third level and another homomorphic ciphertext in response to a request from the host, and a result of the at least one operation is decryptable.

6. The storage device of claim 5, wherein the memory controller is further configured to set a bootstrapped level as the third level based on a type of the at least one operation.

7. The storage device of claim 5, wherein the memory controller is further configured to either provide or decrypt a result of the at least one operation, and upon decrypting the result of the at least one operation, to provide a decrypted result.

8. The storage device of claim 1, wherein the memory controller is further configured to generate a first plaintext by decrypting the first homomorphic ciphertext with the first level, generate a second plaintext by performing an operation on the first plaintext, and generate the second homomorphic ciphertext with the first level by encrypting the second plaintext.

9. The storage device of claim 1, wherein the memory controller is further configured to determine an encryption algorithm for the plaintext based on a field associated with the plaintext, and encrypt the plaintext using the determined encryption algorithm, wherein the determined encryption algorithm is either a homomorphic encryption algorithm or a normal encryption algorithm.

10. A storage system operating method for a storage system including a host and a storage device, the storage system operating method comprising:

encrypting a first plaintext in the storage device to generate a first homomorphic ciphertext with a first level among a plurality of levels, wherein a level of the first homomorphic ciphertext is directly proportional to a maximum number of operations that can be performed on the first homomorphic ciphertext while preserving decryptability, and wherein a level of the first homomorphic ciphertext is directly proportional to a length of the first homomorphic ciphertext;

communicating the first homomorphic ciphertext from the storage device to the host;

performing, in the host, a bootstrapping operation using the first homomorphic ciphertext to generate a second homomorphic ciphertext with a second level greater than the first level;

generating in the host a third homomorphic ciphertext with the first level by performing an operation between the second homomorphic ciphertext and another homomorphic ciphertext;

communicating the third homomorphic ciphertext from the host to the storage device; and generating in the storage device a second plaintext by decrypting the third homomorphic ciphertext, wherein the length of the first homomorphic ciphertext and the third homomorphic ciphertext is a smallest length such that each of the first homomorphic ciphertext and the third homomorphic ciphertext is decryptable.

11. The storage system operating method of claim 10, wherein a second length of the second homomorphic ciphertext is greater than the smallest length.

12. The storage system operating method of claim 10, wherein the second level is determined in accordance with a number of times that at least one operation is to be performed on the second homomorphic ciphertext.

13. The storage system operating method of claim 10, wherein the generating in the host of the third homomorphic ciphertext with the first level includes:

generating a fourth homomorphic ciphertext with a third length as a result of performing the operation; and removing at least one least significant bit (LSB) from the fourth homomorphic ciphertext.

14. The storage system operating method of claim 10, wherein the encrypting of the first plaintext in the storage device to generate the first homomorphic ciphertext with the first level includes:

determining whether a homomorphic operation is required in relation to the first plaintext; and upon determining that the homomorphic operation is required in relation to the first plaintext, encrypting the first plaintext in the storage device to generate the first homomorphic ciphertext with the first level using a homomorphic encryption algorithm, else upon determining that the homomorphic operation is not required in relation to the first plaintext, encrypting the first plaintext in the storage device to generate the first homomorphic ciphertext with the first level using a normal encryption algorithm.

15. A computing system comprising:

a mobile device including a homomorphic encryption circuit configured to encrypt a first plaintext to generate a first homomorphic ciphertext with a first level among a plurality of levels and a storage device configured to store the first homomorphic ciphertext, wherein a level of the first homomorphic ciphertext is directly proportional to a maximum number of operations that can be performed on the first homomorphic ciphertext while preserving decryptability, and wherein the level of the first homomorphic ciphertext is directly proportional to a length of the first homomorphic ciphertext; and a server configured to receive the first homomorphic ciphertext, bootstrap the first homomorphic ciphertext to a second homomorphic ciphertext with a second level greater than the first level, generate a third homomorphic ciphertext with the first level by performing at least one homomorphic operation on the second homomorphic ciphertext, and provide the third homomorphic ciphertext to the mobile device, wherein each of the first and third homomorphic ciphertexts with the first level has a smallest length that is decryptable.

16. The computing system of claim 15, wherein the server is further configured to generate a fourth homomorphic ciphertext with a third level, which is greater than the first level, as a result of the at least one homomorphic operation and to generate the third homomorphic ciphertext with the first level by removing at least one least significant bit (LSB) from the fourth homomorphic ciphertext with the third level.

17. The computing system of claim 16, wherein a second level of the second homomorphic ciphertext is determined in accordance with a number of times that the at least one homomorphic operation is to be performed.

18. The computing system of claim 16, wherein the homomorphic encryption circuit is further configured to encrypt the first plaintext using either a homomorphic encryption algorithm or a normal encryption algorithm based on the at least one homomorphic operation to be performed.

* * * * *